United States Patent
Lee et al.

(10) Patent No.: US 10,761,680 B2
(45) Date of Patent: Sep. 1, 2020

(54) DISPLAY METHOD OF SCENARIO EMOTICON USING INSTANT MESSAGE SERVICE AND USER DEVICE THEREFOR

(71) Applicant: KAKAO CORP., Jeju-si, Jeju-do (KR)

(72) Inventors: Hee Young Lee, Seoul (KR); Hyun Ju Park, Goyang-si (KR); Ji Hyun Kim, Seoul (KR); Yong Jin Lee, Seongnam-si (KR); Jung Hong Choi, Seoul (KR); Yeon Hee Shin, Seoul (KR); Hyun Joo Yeon, Seoul (KR); Joo Hyun Ji, Seongnam-si (KR); Hui Hyeon Kim, Seongnam-si (KR); Se Won Hwang, Goyang-si (KR); Eu Gene Lim, Seongnam-si (KR); Hyung Taek Jeong, Seongnam-si (KR); Jung Gyun Lee, Seongnam-si (KR); Kwang Hoon Kim, Seongnam-si (KR); Geon Young Kim, Seongnam-si (KR); Je Hee Han, Seoul (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 313 days.

(21) Appl. No.: 15/054,566

(22) Filed: Feb. 26, 2016

(65) Prior Publication Data

US 2016/0259526 A1    Sep. 8, 2016

(30) Foreign Application Priority Data

Mar. 3, 2015 (KR) .................. 10-2015-0029957

(51) Int. Cl.
*G06F 3/0481* (2013.01)
*H04L 12/58* (2006.01)
(Continued)

(52) U.S. Cl.
CPC .......... *G06F 3/04817* (2013.01); *G06F 3/048* (2013.01); *G06Q 50/01* (2013.01);
(Continued)

(58) Field of Classification Search
CPC ......... H04L 29/06027; H04L 29/06414; H04L 12/581; H04L 51/04; H04L 51/32;
(Continued)

(56) References Cited

U.S. PATENT DOCUMENTS 6,490,359 B1 * 12/2002 Gibson ................ G10H 1/0008
381/119
6,954,902 B2 * 10/2005 Noma ................... G06F 16/954
715/753

(Continued)

FOREIGN PATENT DOCUMENTS

JP    H09147135 A    6/1997
JP    2012019499 A   1/2012
(Continued)

*Primary Examiner* — Ryan F Pitaro
(74) *Attorney, Agent, or Firm* — Hamre, Schumann, Mueller & Larson, P.C.

(57) ABSTRACT

A display method of a scenario emoticon using an instant message service is provided. The display method includes displaying a scenario emoticon selection region showing at least one thumbnail image of at least one scenario emoticon; receiving an input of a selection upon one from the at least one thumbnail image; and displaying, in response to the selection, a scenario emoticon on a display region within a chat window where an instant message is output. When the play file is played, the at least one object is displayed according to a preset scenario, if a user interaction upon the object is input while the play file is played, a status of the object is changed in response to the user interaction.

19 Claims, 12 Drawing Sheets

(51) Int. Cl.
*G06Q 50/00* (2012.01)
*G06F 3/048* (2013.01)

(52) U.S. Cl.
CPC .............. *H04L 51/04* (2013.01); *H04L 51/10* (2013.01); *G06F 2203/04803* (2013.01); *H04L 51/32* (2013.01)

(58) Field of Classification Search
CPC ... H04L 51/046; H04L 51/10; G06F 3/04817; G06F 2203/04803; G06F 3/048; G06Q 50/01
See application file for complete search history.

(56) References Cited

U.S. PATENT DOCUMENTS

| | | | | |
|---|---|---|---|---|
| 7,343,561 | B1* | 3/2008 | Stochosky | G06Q 10/10 715/715 |
| 7,908,554 | B1* | 3/2011 | Blattner | G06Q 10/107 715/706 |
| 9,584,455 | B2* | 2/2017 | Zheng | G06F 9/451 |
| 2005/0216568 | A1* | 9/2005 | Walkush | G06Q 10/107 709/207 |
| 2006/0101162 | A1* | 5/2006 | Ivarsy | G06F 9/451 710/8 |
| 2006/0154711 | A1* | 7/2006 | Ellis | G06N 3/004 463/1 |
| 2007/0083823 | A1* | 4/2007 | Jaeger | G06F 3/0481 715/787 |
| 2008/0039124 | A1* | 2/2008 | Linder | H04M 1/72544 455/466 |
| 2008/0114848 | A1* | 5/2008 | Lira | G06Q 10/107 709/206 |
| 2010/0146437 | A1* | 6/2010 | Woodcock | G06Q 30/06 715/806 |
| 2011/0041086 | A1* | 2/2011 | Kim | G06F 3/0488 715/764 |
| 2011/0294525 | A1* | 12/2011 | Jonsson | G06F 17/27 455/466 |
| 2012/0059787 | A1* | 3/2012 | Brown | G06F 17/241 706/52 |
| 2012/0069028 | A1* | 3/2012 | Bouguerra | H04L 51/10 345/473 |
| 2012/0207309 | A1* | 8/2012 | Eppolito | H04S 7/40 381/17 |
| 2012/0270578 | A1* | 10/2012 | Feghali | H04W 4/14 455/466 |
| 2013/0060875 | A1* | 3/2013 | Burnett | H04N 21/4788 709/206 |
| 2013/0238724 | A1* | 9/2013 | Cunningham | G06F 3/0482 709/206 |
| 2014/0082520 | A1* | 3/2014 | Mamoun | H04M 1/72552 715/752 |
| 2014/0125699 | A1* | 5/2014 | Lotto | G06T 19/006 345/633 |
| 2014/0198121 | A1* | 7/2014 | Tong | G06T 11/60 345/581 |
| 2014/0344726 | A1* | 11/2014 | He | H04L 51/046 715/758 |
| 2014/0351720 | A1* | 11/2014 | Yin | H04N 7/157 715/758 |
| 2015/0109532 | A1* | 4/2015 | Lewis | H04N 5/44513 348/564 |
| 2015/0121251 | A1* | 4/2015 | Kadirvel | H04M 1/72544 715/753 |
| 2015/0334075 | A1* | 11/2015 | Wang | G07C 13/00 715/752 |
| 2015/0341472 | A1* | 11/2015 | Yanofski | H04L 69/162 709/203 |
| 2016/0028666 | A1* | 1/2016 | Li | G06F 3/0482 715/752 |
| 2016/0048995 | A1* | 2/2016 | Sun | G01W 1/06 345/474 |
| 2016/0149838 | A1* | 5/2016 | Jeong | H04M 1/72552 715/753 |
| 2017/0359703 | A1* | 12/2017 | Ciechanowski | H04W 4/14 |
| 2017/0373994 | A1* | 12/2017 | Chen | H04L 51/04 |
| 2018/0007489 | A1* | 1/2018 | Lehtiniemi | H04S 7/303 |

FOREIGN PATENT DOCUMENTS

| | | |
|---|---|---|
| JP | 2013097814 A | 5/2013 |
| KR | 10-0706427 B1 | 4/2007 |
| KR | 10-2008-0026792 A | 3/2008 |
| KR | 10-2008-0035270 A | 4/2008 |
| KR | 10-2013-0009018 A | 1/2013 |
| KR | 10-2013-0049416 A | 5/2013 |
| WO | 2014127625 A1 | 8/2014 |

* cited by examiner

DISPLAY METHOD OF SCENARIO EMOTICON USING INSTANT MESSAGE SERVICE AND USER DEVICE THEREFOR

CROSS-REFERENCE TO RELATED APPLICATION

This application claims the benefit under 35 USC 119(a) of Korean Patent Application No. 10-2015-0029957 filed on Mar. 3, 2015, in the Korean Intellectual Property Office, the entire disclosures of which are incorporated herein by reference for all purposes.

TECHNICAL FIELD

The present disclosure relates to a display method of an emoticon using an instant message service and a user device therefor.

BACKGROUND

Generally, social network services (SNS) provide the following three functions.

First, the SNS provides a network or networking function that enables a user to have relationships with other users and maintain and manage the relationships. Second, the SNS provides a communication function that enables users to exchange messages. The users may have public, semi-public, and private communication with each other. Third, the SNS provides a media sharing function that enables media objects, such as photos, music, and music videos, to be shared based on the SNS, and also, conversations about the media objects account for a great part thereof. In this respect, the SNS can be regarded as functioning as a networking platform, a communication platform, and a media platform.

Meanwhile, recently, an instant message service has been commercialized. The instant message service enables acquaintances to exchange instant messages and thus instantly share information in a mobile and online environment using the SNS functioning as the communication platform.

SUMMARY

The exemplary embodiments of the present disclosure provide a method for displaying a scenario emoticon, which is played over time, using an instant message service and a user device therefor.

However, problems to be solved by the present disclosure are not limited to the above-described problem. There may be other problems to be solved by the present disclosure.

A display method of a scenario emoticon using an instant message service performed by a user device is disclosed. The display method may include displaying a scenario emoticon selection region showing at least one thumbnail image of at least one scenario emoticon; receiving an input of a selection upon one from the at least one thumbnail image; and displaying, in response to the selection, a scenario emoticon on a display region within a chat window where an instant message is output, wherein in the displaying of the scenario emoticon, a play file is played in order for at least one object included in the scenario emoticon to be overlapped with a previously output speech bubble region within the display region, when the play file is played, the at least one object is displayed according to a preset scenario, if a user interaction upon the object is input while the play file is played, a status of the object is changed in response to the user interaction, and the play file includes at least one image file corresponding to the at least one object and a metafile including configuration data defining an expression according to a scenario of the object.

A user device that displays a scenario emoticon using an instant message service is disclosed. The user device may include a memory configured to store a program for performing a display method of an emoticon using an instant message service, thumbnail images of multiple scenario emoticons, and a scenario emoticon file; and a processor configured to execute the program, wherein when the program is executed, the processor generates a chat window in which two or more users participate, displays an instant message input by the users on a display region, displays an emoticon selection region showing the thumbnail images stored in the memory, and receives an input of the user's selection upon one of the thumbnail images, the processor reads a scenario emoticon file corresponding to the selected thumbnail image from the memory and plays a play file included in the scenario emoticon file on the display region, when the play file is played, at least one object included in the scenario emoticon is played to be overlapped with a speech bubble region shown within the display region, the at least one object is displayed according to a preset scenario, if a user interaction upon the object is input while the play file is played, a status of the object is changed in response to the user interaction, and the play file includes at least one image file corresponding to the at least one object and a metafile including configuration data defining an expression according to a scenario of the object.

According to any one of the above-described exemplary embodiment of the present disclosure, a scenario emoticon, which is played over time, is displayed using a whole region rather than a partial region of a display region on a chat window. Therefore, it is possible to provide an instant message service that makes it possible to variously display a user's feelings and opinions.

Further, according to any one of the above-described exemplary embodiment of the present disclosure, a thumbnail image and a preview of a scenario emoticon are provided. Therefore, a user can previously check an expression of an object according to a scenario of a scenario emoticon and thus can easily select a scenario emoticon he/she wants.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
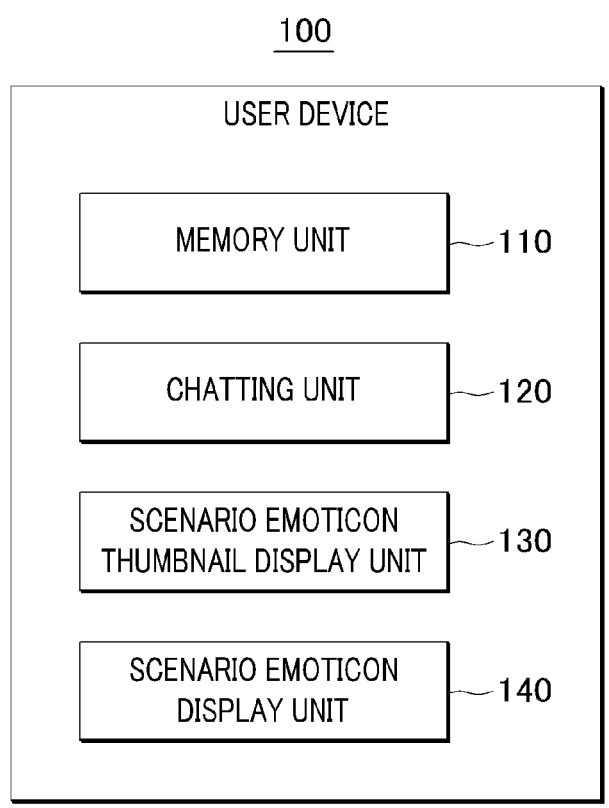
FIG. 1 is a diagram illustrating a configuration of a user device that displays a scenario emoticon using an instant message in accordance with various embodiments described herein.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a diagram illustrating a configuration of a user device that displays a scenario emoticon using an instant message in accordance with various embodiments described herein.

For reference, a user device 100 in accordance with an exemplary embodiment of the present disclosure is a device which can access an instant message service server (not illustrated) and a scenario emoticon providing server, and may be, for example, a wireless communication device that ensures portability and mobility. That is, the user device 100 may include all kinds of handheld-based wireless communication devices such as IMT (International Mobile Telecommunication)-2000, CDMA (Code Division Multiple Access)-2000, W-CDMA (W-Code Division Multiple Access), and LTE (Long Term Evolution) device. In particular, the user device 100 may be an intelligent device having a computer supporting function, such as Internet communication and information search, in addition to a portable device, and may be a smart phone or a tablet PC in which multiple application programs (i.e., applications) desired by a user may be installed and executed. Otherwise, the user device 100 may be a device which can access an instant message service server such as a PC through wired/wireless communication.

Meanwhile, multiple user devices 100 are connected to an instant message service server (not illustrated) and each other via a network, and, thus, can perform a chatting service using an instant message. As such, the network connecting the components constituting a chatting system using an instant message service refers to a connection structure that enables information exchange between nodes such as devices and servers. Examples of the network may include 3GPP (3rd Generation Partnership Project) network, LTE (Long Term Evolution) network, WIMAX (World Interoperability for Microwave Access) network, Internet, LAN (Local Area Network), Wireless LAN (Wireless Local Area Network), WAN (Wide Area Network), PAN (Personal Area Network), Bluetooth network, satellite broadcasting network, analog broadcasting network, DMB (Digital Multimedia Broadcasting) network, and the like, but may not be limited thereto.

In an exemplary embodiment of the present disclosure, the user device 100 may include a memory (hereinafter, referred to as "memory unit 110") in which a program for performing a display method of an emoticon using an instant message service is stored and a processor configured to execute the program. Herein, the processor may perform various functions as the program stored in the memory is executed. As illustrated in FIG. 1, sub-modules included in the processor depending on the respective functions may include a chatting unit 120, a scenario emoticon thumbnail display unit 130, and a scenario emoticon display unit 140.

The memory unit 110 stores thumbnail images of multiple scenario emoticons and scenario emoticon files.

The scenario emoticon is an emoticon that expresses a motion of at least one object over time. The scenario emoticon can express a motion of an object using a whole region of a chat window as well as a limited region in the chat window like a conventional emoticon. The scenario emoticon file includes a play file. The play file includes a metafile including all configuration data defined to express a motion according to a scenario to correspond to an object and at least one image file corresponding to the object. Herein, the metafile may include a time and a location to be displayed corresponding to the object, an animation performed during a display, a motion (e.g., play of another object, play of a sound source, a vibration of the user device, and a web page movement) corresponding to the object responding to a user interaction to be described later, and information about an image (static or dynamic image) to be displayed before the play file is played or when play of the play file is ended.

Meanwhile, a scenario emoticon may include one or more play files, and the play files may respectively include configuration data of different objects. By way of example, a play file of a scenario emoticon may include one file including various moving images (i.e., objects), and the images in the play file may express preset motions until the images disappear from a screen according to predetermined scenarios, respectively. Further, the scenario emoticon may be a combination of multiple play files each including a moving image (i.e., an object). For reference, if a whole scenario is implemented by configuring the scenario emoticon with an image, the image needs to have a size corresponding to a whole display region, whereas if the scenario emoticon is configured with multiple play files, multiple images having small capacities are used. Thus, a whole file size is reduced and an additional event generated in each image region can be easily obtained. That is, if multiple objects are implemented with one play file, only one view provided by a platform is used. Thus, considering a playing time and location coordinates within a display region where a specific event is generated, it is necessary to determine an object where an event is generated and a scenario suitable for the object. Meanwhile, if each of the multiple objects includes a play file, a view is generated for each object (i.e., a moving image). Thus, it is possible to instantly process an event or a scenario of the corresponding object without a condition for identifying the object. Herein, the moving image of the scenario emoticon may be implemented with a WebP file. Further, the play file may express a motion of an object according to a scenario and also generate an additional operation in a user device, such as play of a sound source and a vibration of the user device.

The chatting unit 120 provides an instant message service by generating a chat window in which two or more users participate and displaying an instant message input by the users on a display region. The instant message may include various messages such as a chat message, a video, a photo, audio data, and an emoticon. Particularly, in the present disclosure, a scenario emoticon can be transmitted/received between the participants through the instant message.

The scenario emoticon thumbnail display unit 130 detects the thumbnail images of the scenario emoticons stored in the memory unit 110, and displays an emoticon selection region including the detected thumbnail images on the chat window. Further, the scenario emoticon thumbnail display unit 130 receives a user-selected input with respect to any one of the thumbnail images displayed on the emoticon selection region. Herein, the selection of the scenario emoticon thumbnail image may be generated by a user's touch input or an input using a separate input means. By way of example, the input using the separate input means may include an input such as a cursor movement and selection using a keyboard and a mouse.

Figure 2:
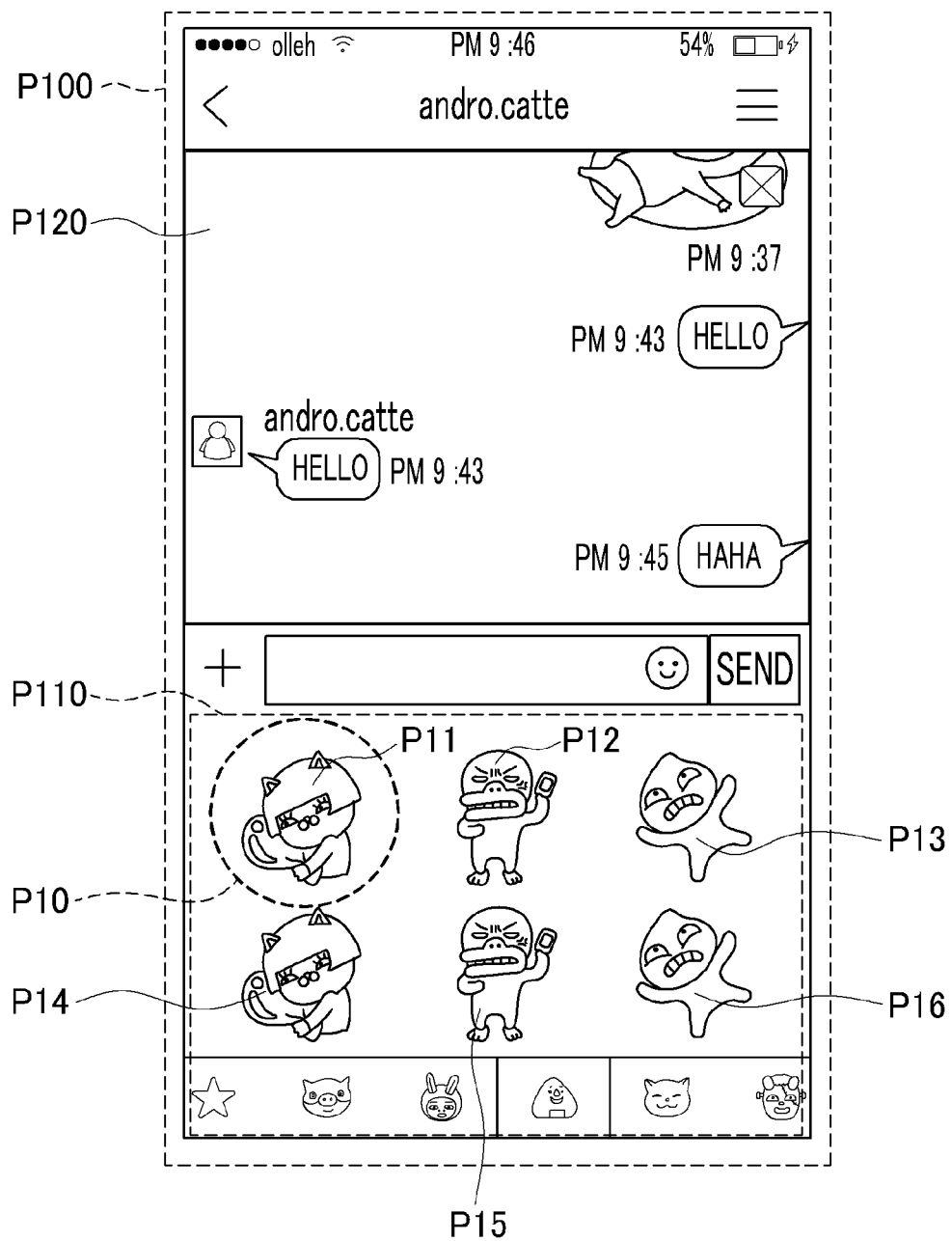
FIG. 2 is an example diagram provided to explain a display method of a scenario emoticon thumbnail in accordance with various embodiments described herein.

Hereinafter, a display method of a scenario emoticon thumbnail will be described with reference to FIG. 1 and FIG. 2. FIG. 2 is an example diagram provided to explain a display method of a scenario emoticon thumbnail in accordance with various embodiments described herein.

If a scenarios emoticon menu is selected among preset user interface menus on a chat window P100, the scenario emoticon thumbnail display unit 130 displays a scenario emoticon selection region P110 in a partial region of the chat window P100 as illustrated in FIG. 2. Herein, the scenario emoticon selection region P110 is distinguished from a display region P120 included in the chat window P100, and multiple scenario emoticon thumbnail images P10 are displayed on the scenario emoticon selection region P110.

Further, the scenario emoticon thumbnail display unit 130 receives a user-selected input with respect to any one of multiple scenario emoticon thumbnail images P11 to P16 displayed on the scenario emoticon selection region P110.

Meanwhile, the scenario emoticon thumbnail display unit 130 may provide a preview function for a scenario emoticon selected by the user. Herein, the scenario emoticon thumbnail display unit 130 may play a preview of a scenario emoticon corresponding to the user-selected thumbnail image on the display region P120 of the chat window P100. For reference, a preview of the scenario emoticon corresponding to the selected thumbnail image may be played on various regions such as a whole region of the chat window, a partial specific region of the display region of the chat window, a whole region of the emoticon selection region, and a partial specific region of the emoticon selection region.

Further, the preview of the scenario emoticon may be played as being overlaid on a preset region (i.e., the whole region of the chat window, the display region, and the emoticon selection region).

Further, the scenario emoticon thumbnail display unit 130 receives a transmission input of the scenario emoticon corresponding to the previewed thumbnail image from the user. For reference, the scenario emoticon thumbnail display unit 130 may automatically skip a preset input process of a user interaction (to be described below) while a preview of a play file of a scenario emoticon is played.

Figure 3A:
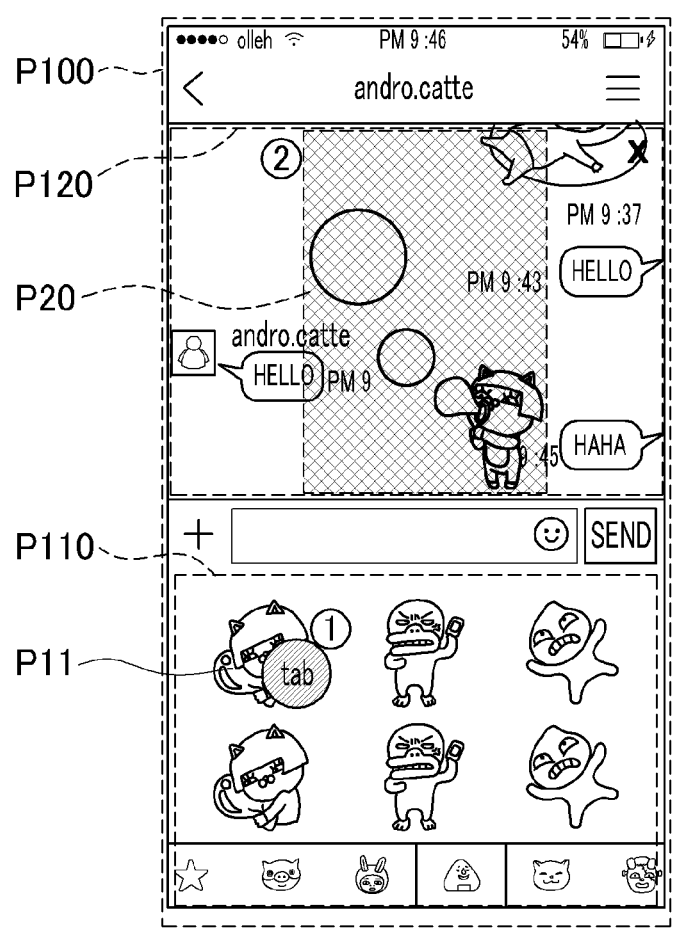
FIGS. 3A and 3B is a diagram provided to explain a scenario emoticon preview function using a scenario emoticon thumbnail image in accordance with various embodiments described herein.
Figure 3B:
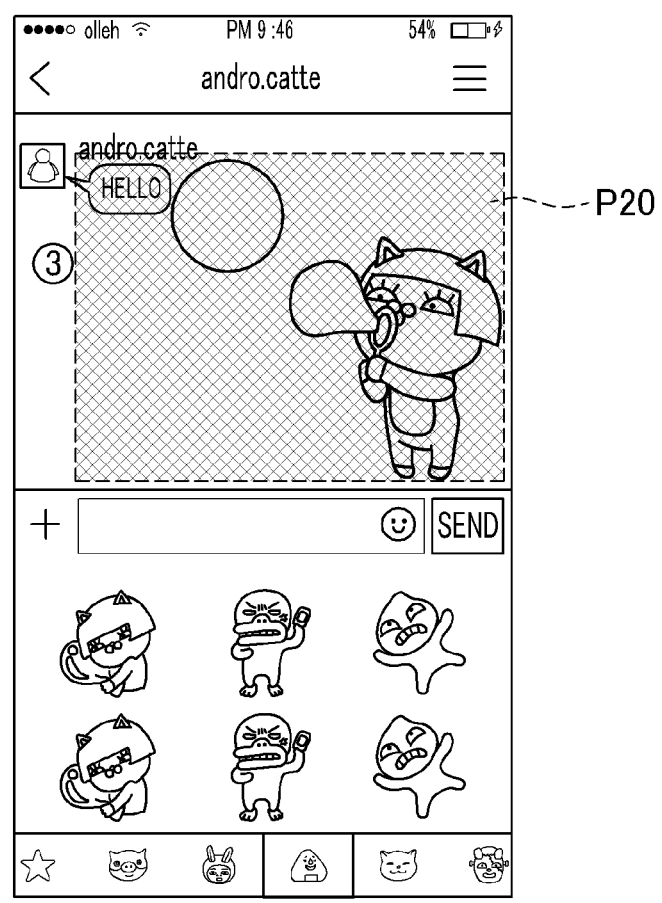

Hereinafter, a scenario emoticon preview function will be described with reference to FIGS. 3A and 3B. FIGS. 3A and 3B is a diagram provided to explain a scenario emoticon preview function using a scenario emoticon thumbnail image in accordance with an exemplary embodiment of the present disclosure.

As illustrated in FIG. 3A, if a user selects a first thumbnail image P11 from the multiple thumbnail images included in the emoticon selection region P110 by tabbing (①), a preview of a scenario emoticon P20 corresponding to the first thumbnail image P11 is played on the display region P120 of the chat window P100 (②).

Herein, as illustrated in FIG. 3A, a preview of the whole scenario emoticon P20 can be played by reducing a size of the scenario emoticon P20 while preserving an original aspect ratio thereof. FIG. 3A illustrates that a preview of the scenario emoticon P20 is displayed by uniformly reducing a size of an object included in the scenario emoticon P20 and coordinates of the object in the display region P120 to be suitable for a height of the emoticon selection region P110.

As another example of play of a preview of a scenario emoticon, a preview of the scenario emoticon P20 may be played by cropping only a partial region of the scenario emoticon P20 without adjusting a size of the scenario emoticon P20. FIG. 3B illustrates that a preview of the scenario emoticon P20 is displayed by cropping only a partial region (i.e., "lower part") of the scenario emoticon P20 to be suitable for a height of the emoticon selection region P110 (③). As such, if only a partial region is displayed when a preview of the scenario emoticon P20 is played, only a part of the objet included in the scenario emoticon P20 may be displayed.

FIG. 3A and FIG. 3B respectively illustrate examples where a preview of a scenario emoticon is played on a whole region and a partial specific region of the display region P120 of the chat window. However, according to another exemplary embodiment of the present disclosure, a preview of a scenario emoticon may be played on various regions such as a whole region of the chat window, a whole or partial specific region of the emoticon selection region, and the like in addition to the display region of the chat window. Further, FIG. 3A and FIG. 3B respectively illustrate examples where a preview of a scenario emoticon is overlaid on the display region P120. That is, FIG. 3A and FIG. 3B respectively illustrate examples where a preview of a scenario emoticon is set as a layer having a predetermined transparency and overlaid on the display region P120 in order to check other instant messages displayed in the display region P120 during the preview of the scenario emoticon. However, according to another exemplary embodiment of the present disclosure, a preview of a scenario emoticon may be played solely on a preset region. That is, if a preview of a scenario emoticon is played solely, the preview of the scenario emoticon may be set as a layer without transparency and displayed solely within a play region.

Referring to FIG. 1 again, the scenario emoticon display unit 140 reads a scenario emoticon file corresponding to the thumbnail image selected through the scenario emoticon thumbnail display unit 130 from the memory unit 110. Then, the scenario emoticon display unit 140 plays a play file included in the read scenario emoticon file on a preset region. Herein, the scenario emoticon display unit 140 may set various regions, such as the whole region of the chat window, the display region in the chat window, and a whole region of a display window of the user device, as a scenario emoticon display region. In the following, for convenience in explanation, there will be described an example where the scenario emoticon display unit 140 plays the play file of the scenario emoticon on the display region of the chat window (i.e., a region where instant messages are output).

Further, while the play file is played, the scenario emoticon may be overlaid or displayed solely on the preset region. By way of example, as the play file of the scenario emoticon is executed, at least one object included in the scenario emoticon may be played to be overlapped with a speech bubble region output in the display region of the chat window. Herein, the speech bubble region refers to a region where instant messages such as chatting messages are output. Further, while the scenario emoticon is played, there may be changes of movements and properties of the objects, such as a coordinate shift, a size change, a transparency change, and rotation, in the display region.

To be specific, while the play file of the scenario emoticon is played, the scenario emoticon display unit 140 extracts multiple objects (i.e., moving images) and a metafile and displays the respective objects on specified locations in the preset display region according to an order preset in the metafile to perform an animation specified in the metafile. Further, when a user interaction about a view corresponding to the displayed object (to be described below) is generated, the scenario emoticon display unit 140 performs an operation defined in the metafile in response to the view and the interaction.

Herein, prior to play of a scenario emoticon, the scenario emoticon display unit 140 may check whether a play file of the scenario emoticon is stored in the memory unit 110 to determine whether or not to download the play file. That is, if a play file of a user-selected scenario emoticon is stored in the memory unit 110, the scenario emoticon display unit 140 instantly reads and plays the play file. On the other hand, if a play file of a user-selected scenario emoticon is not stored in the memory unit 110, the scenario emoticon display unit 140 downloads the play file of the scenario emoticon from a scenario emoticon providing server (not illustrated) and stores the play file in the memory unit 110 and then plays the play file.

Meanwhile, if a user interaction about an object is input while the play file of the scenario emoticon is played, a status of the object of the scenario emoticon is changed in response to the user interaction. That is, the object about which the user interaction is generated expresses a motion according to a different scenario from a scenario when a user interaction event is not generated.

In this case, the status of the object about which the user interaction is generated may be changed on the basis of at least one of conditions including a current location of the object in the display region, an input time of the interaction, a current display mode of the chat window, and a kind of the interaction. Further, in the object about which the user interaction occurs, at least one of a location on the display region in the chat window, a movement speed, a movement direction, and properties may be changed. By way of example, a change of the object according to a scenario corresponding to a generation time of an interaction (e.g., "click") event may be displayed by checking only whether or not the interaction event is generated. Herein, the properties of the object may include a size, transparency, a shape, a color, and the like. Further, the kind of the interaction may include at least one of a click, a tap, a drag and drop, a swipe, a pinch to zoom, and a flick by a user.

A process of displaying the object of the scenario emoticon according to a preset scenario will be described in detail with reference to FIGS. 4A and 4B to FIGS. 7A and 7B.

Meanwhile, the scenario emoticon file may further include an E-mot file displayed before the play file in addition to the play file. The E-mot file may be displayed even after play of the play file is ended. E-mot files respectively displayed before and after the play file may include different images.

To be specific, the scenario emoticon display unit 140 reads a user-selected scenario emoticon file from the memory unit 110, and the read scenario emoticon display unit 140 includes a play file and an E-mot file. Herein, the E-mot file includes a preset static or dynamic image. An image of the E-mot file (hereinafter, referred to as "E-mot image") is displayed on a preset region. For reference, the E-mot image may be displayed on the speech bubble region. Further, the above-described scenario emoticon thumbnail display unit 130 may omit a display of the E-mot file and play only the play file in a preview of the scenario emoticon.

When the scenario emoticon file is executed as such, the E-mot file may be displayed before the play file is played and at a preset playing time after the E-mot file is displayed, the play file is played. For reference, the playing time of the play file may be set such that the play file can be automatically played immediately or in a certain period of time after the E-mot file is displayed.

Meanwhile, the E-mot file displayed by the scenario emoticon display unit 140 is also displayed on a display region of a device of a conversation partner participating in the chat window. Herein, on the display region of the device of the conversation partner, the play file may be automatically played in a preset period of waiting time after the E-mot file is displayed or may be played when a user interaction is input. By way of example, if the E-mot file is received while the display region of the device of the conversation partner is in an active state, the play file may be automatically played after the E-mot file is displayed. That is, if the device of the conversation partner participating in the chat window receives the scenario emoticon while displaying the chat window, the received E-mot file is instantly displayed and after play of the E-mot file is ended, the play file is automatically played. Meanwhile, if the E-mot file is received while the display region of the device of the conversation partner is in an inactive state, the E-mot file and the play file may be played depending on generation of a specific event after the display region of the chat window is converted into an active state. That is, after an E-mot is displayed on the display region of the device of the conversation partner, if a user interaction about the E-mot image is input, the play file may be played.

Further, while the play file is played after the E-mot file is displayed, a status of an image of the E-mot file may be changed from a status before the play file is played. By way of example, a shape of the E-mot image may be changed from a shape before the play file is played or the E-mot image may temporarily disappear from the chat window. Herein, after play of the play file is ended, the E-mot image may be returned to its original status or a preset E-mot image corresponding to the end of play of the play file may be displayed.

Figure 4A:
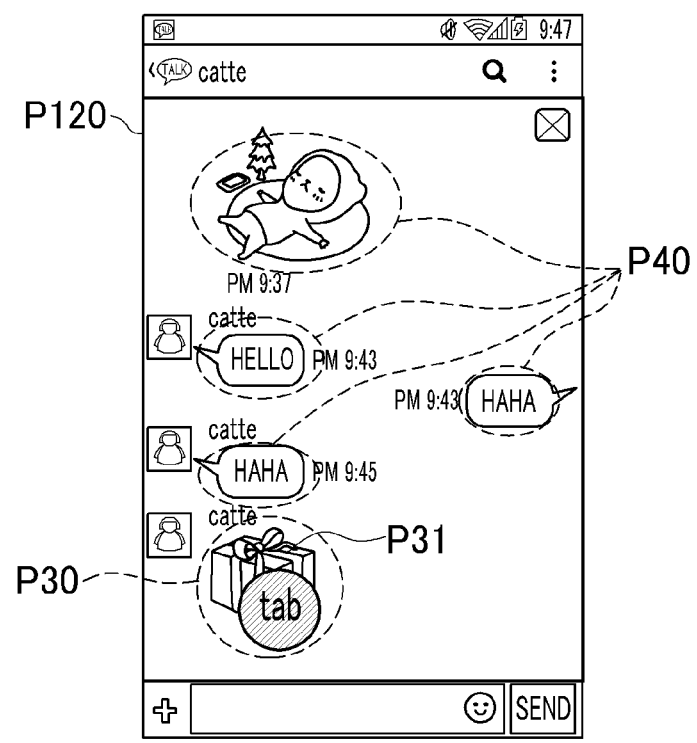
FIGS. 4A and 4B is an example diagram provided to explain a play process of an E-mot file and a play file of a scenario emoticon in accordance with various embodiments described herein.
Figure 4B:
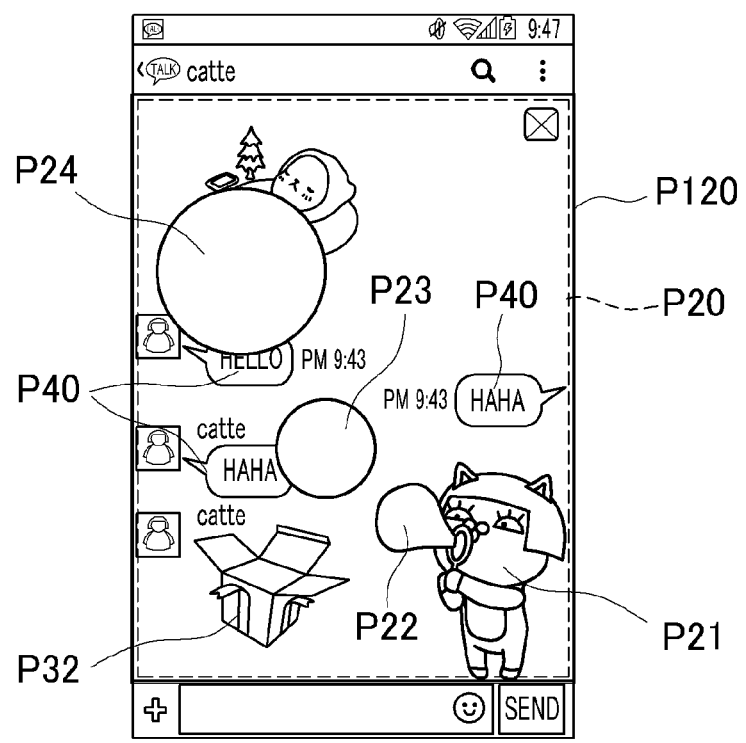

To be specific, FIGS. 4A and 4B is an exemplary diagram provided to explain a play process of an E-mot file and a play file of a scenario emoticon in accordance with an exemplary embodiment of the present disclosure.

FIG. 4A illustrates an example where an E-mot image P30 is displayed while a speech bubble region P40 such as a chatting message and an emoticon is displayed on the display region P120 of the chat window. As such, if a user interaction (illustrated as "tab" in FIG. 4A) about the E-mot image P30 displayed on the display region P120 is generated, the scenario emoticon P40 is played after the E-mot file P30 is played as illustrated in FIG. 4B.

FIGS. 4A and 4B illustrates that an E-mot image of the E-mot file P30 is changed from a first status P31 to a second status P32 while the scenario emoticon P20 is played after the user interaction about the E-mot file P30 is generated. As such, a static or dynamic image of the E-mot file P30 is displayed before motions of the objects of the scenario emoticon P20 according to a scenario are expressed, and, thus, the user's expectation about a scenario emoticon is increased. Further, whether or not to play a scenario emoticon and a playing time can be selected, and, thus, the user's convenience can be improved. That is, the E-mot image P31 first displayed on the display region P120 may be set to have at least one of a shape and a motion that induce a user interaction. By way of example, FIG. 4A illustrates a dynamic emoticon "a gift box with a moving ribbon" as the E-mot image P31.

Meanwhile, as illustrated in FIGS. 4A and 4B, the scenario emoticon P20 includes multiple objects P21 to P24 and is displayed as being overlapped with the speech bubble region P40 to use the whole region of the display region P120.

By way of example, in a scenario of the scenario emoticon P20 illustrated in FIG. 4B, a bubble-shaped object is continuously generated from the specific object P21 and a shape, a size, location coordinates, a movement speed, and a movement direction of the bubble-shaped object are gradually changed over time. Herein, a status of the bubble-shaped object is changed over time according to the scenario, so that the bubble-shaped object may be changed from the object P22 at a first location to the object P23 at a second location and then changed to the object P24 at a third location. That is, any object may be continuously generated according to the scenario of the scenario emoticon P20 and changed in status (from P22 to P24) and then may gradually disappear, and such a motion may be repeatedly played for a preset period of time.

While a play file of the scenario emoticon P20 is played, a user interaction about at least one of the fixed object P21 and the objects P22 to P24 changed in status after generation may occur. In this case, a status of the corresponding object may be changed in response to the user interaction. By way of example, if a user interaction (e.g., "tab") about the object P24 at the third location is generated in the scenario emoticon P20 illustrated in FIGS. 4A and 4B, a bubble popping effect may be played according to a scenario set for the corresponding object P24 and the bubble-shaped object P24 may be changed in shape to be popped and then may disappear. It is possible to set various interactions about the object of the scenario emoticon P20. A status change of the object may be different for each interaction. Further, a status change of the object may be different depending on various conditions such as a location of the object in the display region 120, an input time of the interaction, and a display mode of the chat window P120.

As such, the scenario emoticon P20 may be displayed using at least a partial region of the whole display region P120 while not affecting the other user interfaces. That is, while the play file of the scenario emoticon P20 is played, other instant messages such as chatting messages can be input and displayed. By way of example, as illustrated in FIG. 4B, the whole speech bubble region P40 except the speech bubble region P40 covered with the objects P21 to P24 of the scenario emoticon P20 is normally displayed to be distinguishable. Further, a location and a content of the speech bubble region P40 in the display region P120 are also displayed as being continuously changed by instant messages continuously generated while the play file of the scenario emoticon P20 is played. That is, a chatting message input while the play file of the scenario emoticon P20 is played may be displayed together with the scenario emoticon P20 within the display region P120.

Further, if a user interaction is input in a region where the objects P21 to P24 are not displayed within the display region P120 while the play file of the scenario emoticon P20 is played, a display of the scenario emoticon P20 may be ended. By way of example, if a user "tabs" any region where the objects P21 to P24 are not displayed within the display region P120 before the end of a preset period of time for playing the scenario emoticon P20, play of the scenario emoticon P20 may be instantly ended. For reference, if a user interaction is input in the region where the objects are not displayed within the display region P120 while the play file is played, a play file of another scenario different from the play file being currently played may be triggered to change a scenario.

Furthermore, if a user's selection of any one of user interface menus included in the chat window P100 is input while the play file of the scenario emoticon P20 is played, a display of the scenario emoticon P20 may be ended and the corresponding user interface may be executed.

Moreover, if a reentrance into the chat window where the play file of the scenario emoticon P20 is played or the scenario emoticon P20 is first input occurs or a scroll event occurs in the display region, the E-mot file may be updated and the play file may be replayed. Herein, if the reentrance into the chat window or the scroll event in the display region occurs, a separate image that induces an input of a user interaction for starting play of the play file may be further displayed on the previously received scenario emoticon P20. That is, an image such as a play button may be displayed on the E-mot image of the corresponding scenario emoticon P20. Further, an image that induces a user interaction for ending or temporarily stopping the scenario emoticon P20 may be further displayed while the play file is played. By way of example, if the E-mot image is changed and then continuously output on the display region while the play file is played, an image such as a stop button may be further displayed on the E-mot image. Herein, if a user interaction about the play button image is generated, the image may be automatically changed to the stop button image and vice versa. For reference, if a reentrance into the chat window or a scroll event in the display region occurs in the device of the conversation partner, the E-mot file may be updated and the play file may be replayed. Herein, when the play file of the scenario emoticon is replayed, the play file may be played with a status of an object of the scenario emoticon changed from an initial status according to a change in condition for playing, such as an elapsed time condition after receipt or first play of the play file, a place condition, a season condition, and a time condition.

Meanwhile, the memory unit 110 according to an exemplary embodiment of the present disclosure downloads a scenario emoticon file from an instant message service server (not illustrated) or a separate scenario emoticon providing server (not illustrated) that provides scenario emoticons and stores the scenario emoticon file therein. For reference, the instant message service server (not illustrated) and the scenario emoticon providing server (not illustrated) may be operated as independent servers or operated by the same server computer.

Herein, when downloading the scenario emoticon, the memory unit 110 may download an E-mot file together with a play file and matches and stores them. Further, the memory unit 110 may priorly download and store an E-mot file of any scenario emoticon, and may separately download and store a play file later. If only an E-mot file of any scenario emoticon is stored in the memory unit 110, the scenario emoticon display unit 140 may read the E-mot file downloaded in the memory unit 110 and display the E-mot file on the display region of the chat window, and then, if a user interaction about the E-mot file is generated, the scenario emoticon display unit 140 may request a play file of the corresponding scenario emoticon from a server (i.e., the instant message service server or the scenario emoticon providing server) that provides a play file of a scenario emoticon and download the play file.

Further, the scenario emoticon display unit 140 may display an E-mot file of a user-selected scenario emoticon on the display region and then play a play file corresponding to a condition for generating an input of a user interaction about the E-mot file. Herein, as the condition for generating an input of a user interaction, various conditions such as an elapsed time after receipt or display of the E-mot file, a place, a season, a time, and a chatting partner may be set. By way of example, the scenario emoticon display unit 140 may display a play file corresponding to a user interaction about any E-mot file generated immediately after displaying the E-mot file and a play file corresponding to a user interaction generated in a certain period of time after displaying the E-mot file as different play files. Herein, a play file corresponding to each condition for generating an input of a user interaction may be managed by the server (not illustrated) that provides scenario emoticons or autonomously managed by the user device. To be specific, as described above, if only an E-mot file of any scenario emoticon is stored in the memory unit 110, the scenario emoticon display unit 140 requests a play file from the server (not illustrated) that provides scenario emoticons. Herein, if the server (not illustrated) that provides scenario emoticons manages a play file corresponding to each condition for generating an input of a user interaction, the server detects a play file corresponding to a condition for generating an input of a current user interaction and downloads the play file to the user device (i.e., the scenario emoticon display unit 140). Further, if the user device manages a play file corresponding to each condition for generating an input of a user interaction, the scenario emoticon display unit 140 downloads all of play files corresponding to the respective conditions for generating an input of a user interaction from the server, and then detects and plays a play file corresponding to a condition for generating an input of a current user interaction.

Meanwhile, the scenario emoticon display unit 140 may display the scenario emoticon P20 by adjusting and changing a status of the scenario emoticon P20 depending on a display mode of the chat window P100. Hereinafter, various display methods of a scenario emoticon depending on a display mode of a chat window will be described with reference to FIG. 5 and FIGS. 6A-6C.

Figure 5:
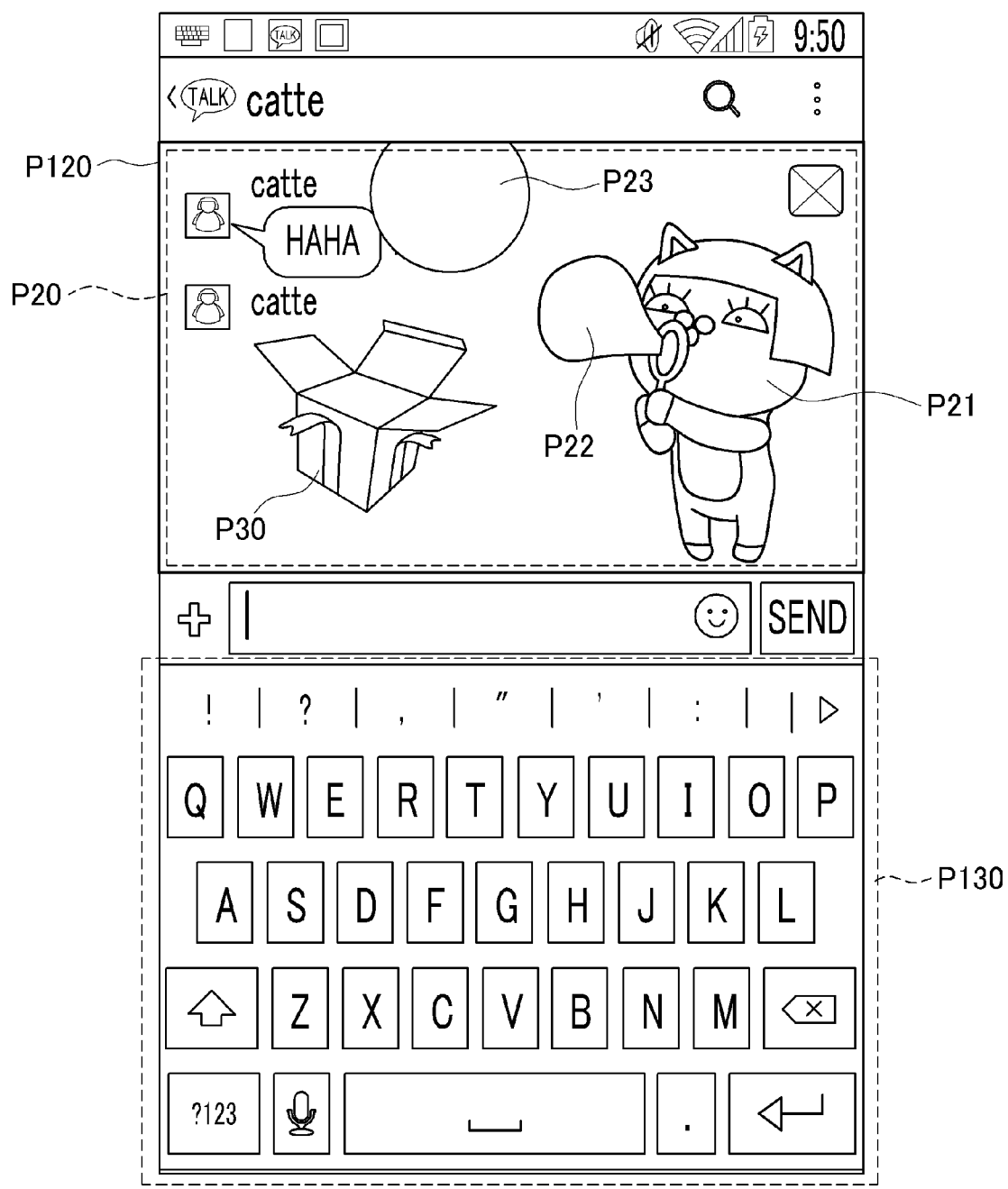
FIG. 5 is an example diagram provided to explain a display method of a scenario emoticon on a chat window in a portrait view mode in accordance with various embodiments described herein.
Figure 6A:
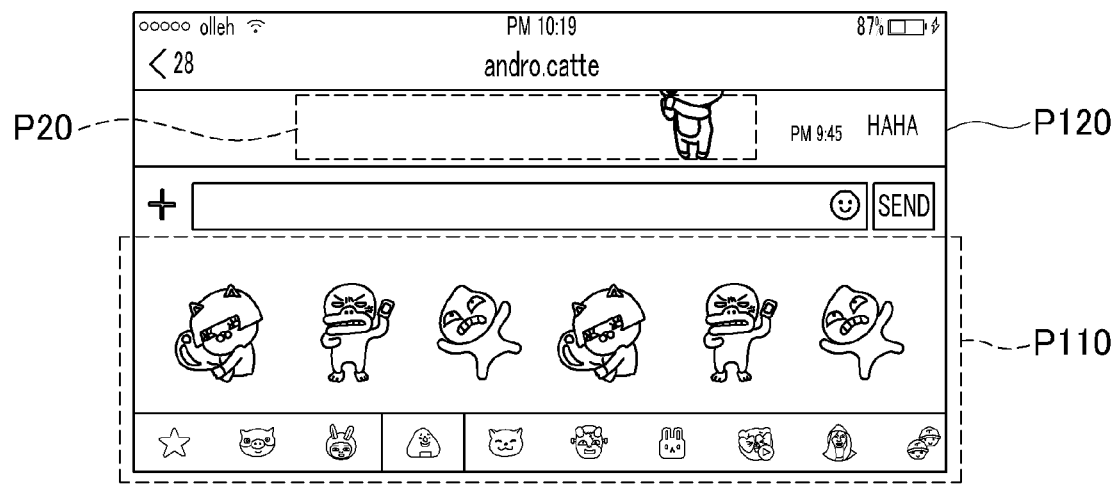
FIGS. 6A, 6B and 6C is an example diagram provided to explain a display method of a scenario emoticon on a chat window in a landscape view mode in accordance with various embodiments described herein.
Figure 6B:
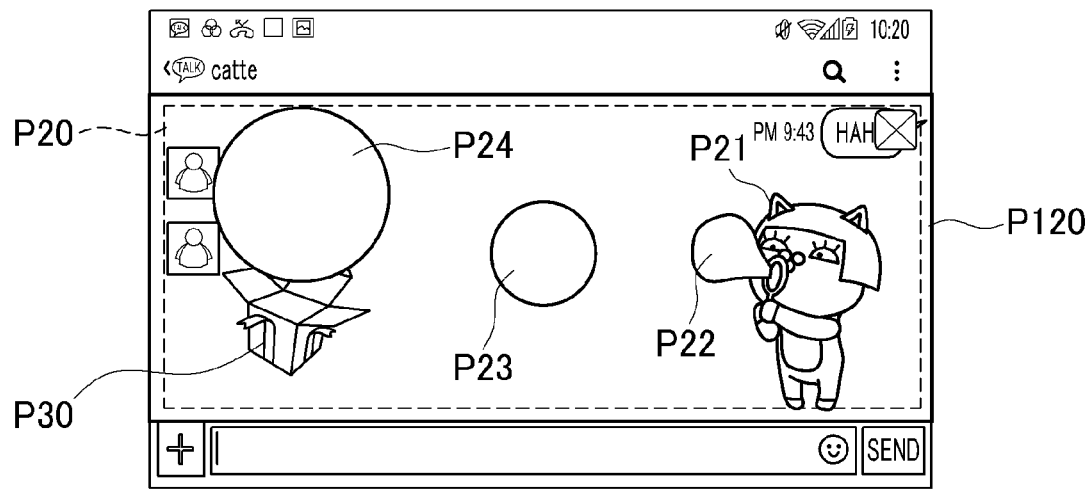
Figure 6C:
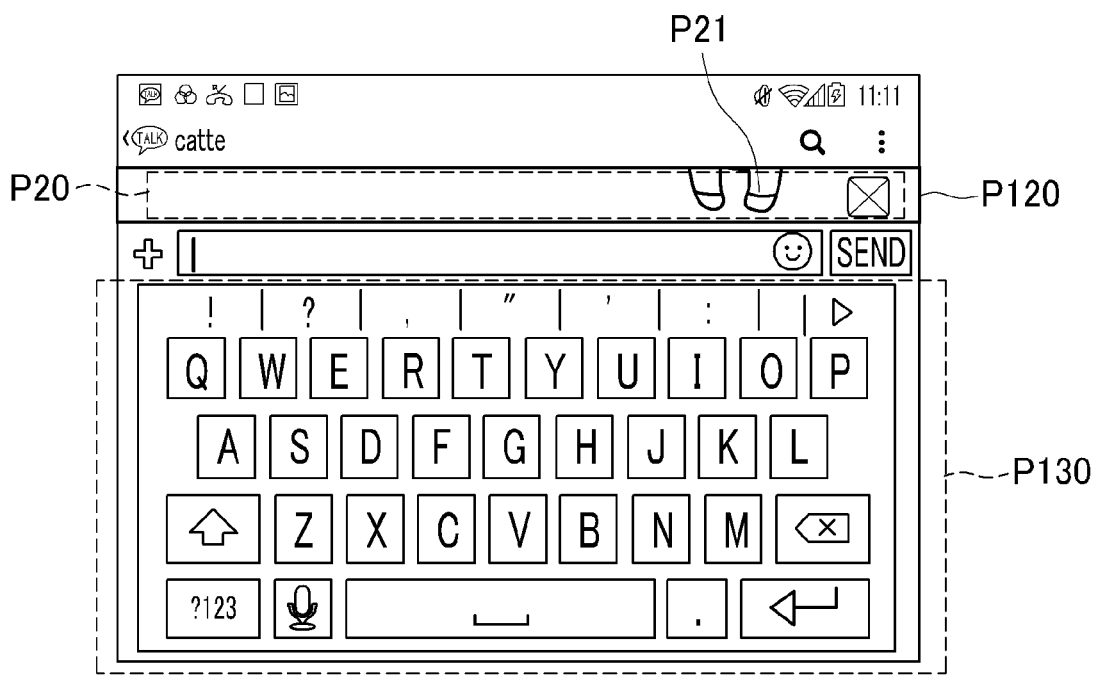

To be specific, FIG. 5 is an example diagram provided to explain a display method of a scenario emoticon on a chat window in a portrait view mode in accordance with various embodiments described herein. Further, FIGS. 6A-6C is an exemplary diagram provided to explain a display method of a scenario emoticon on a chat window in a landscape view mode in accordance with an exemplary embodiment of the present disclosure.

Herein, FIG. 5 illustrates an active state of a keyboard menu among user interface menus when the display mode of the chat window P100 is a portrait view mode. Further, FIG. 6A illustrates an active state of the scenario emoticon selection region P110 when the display mode of the chat window P100 is a landscape view mode. Furthermore, FIG. 6B illustrates an active state of the display region P120 on the whole region of the chat window P100 when the display mode of the chat window P100 is the landscape view mode. Moreover, FIG. 6C illustrates an active state of a keyboard menu P130 when the display mode of the chat window P100 is the landscape view mode.

As described above, while the display mode of the chat window P100 is the portrait view mode or the landscape view mode, the display region P120 may be activated solely or together with another user interface menu (i.e., an emoticon selection window, a keyboard, and the like).

In this case, when the scenario emoticon P20 is displayed as a preview or displayed in a normal manner, the scenario emoticon P20 may be displayed using only the display region P120 which excludes the regions for the other user interfaces menus (i.e., an emoticon selection region, a keyboard region, and the like) from the whole region of the chat window P100. Herein, a partial region of the scenario emoticon P20 may be cropped and displayed corresponding to a size of the display region P120. That is, a portion of a lower part of the scenario emoticon P20 can be cropped and displayed, so that an effect of rolling up the scenario emoticon P20 by the keyboard menu P130 can be implemented as illustrated in FIG. 5. Therefore, among the multiple objects P21 to P24 of the scenario emoticon P20 illustrated above with reference to FIG. 4B, the object P24 displayed on the uppermost region is not displayed and only the other objects P21 to P23 can be displayed. Further, as illustrated in FIG. 6A, the scenario emoticon P20 may be reduced by changing a size and a location of the scenario emoticon P20 corresponding to the size of the display region P120 and only a partial region of the reduced scenario emoticon P20 may be cropped and played as a preview. Furthermore, referring to FIG. 6B and FIG. 6C, it can be seen that only a partial region of the scenario emoticon P20 may be cropped and displayed, and the number, sizes, and locations of the objects of the scenario emoticon P20 may vary depending on the size of the display region P120.

In order to implement various play methods of a scenario emoticon for the respective display modes of the chat window described above, a set of play files for the respective display modes of the chat window may be manufactured as a play file of the scenario emoticon P20. Further, different scenarios of the same scenario emoticon may be set for the respective display modes of the chat window. That is, when a scenario emoticon is played according to a display mode of the chat window, at least one of the number, statuses, and motions of objects displayed on the display region may be changed.

Meanwhile, the user device 100 that displays a scenario emoticon according to an exemplary embodiment of the present disclosure may further include a scenario emoticon purchasing unit (not illustrated) that outputs an item purchase window where a scenario emoticon can be purchased.

Hereinafter, a process of purchasing a scenario emoticon in accordance with an exemplary embodiment of the present disclosure will be described with reference to FIGS. 7A and 7B.

Figure 7A:
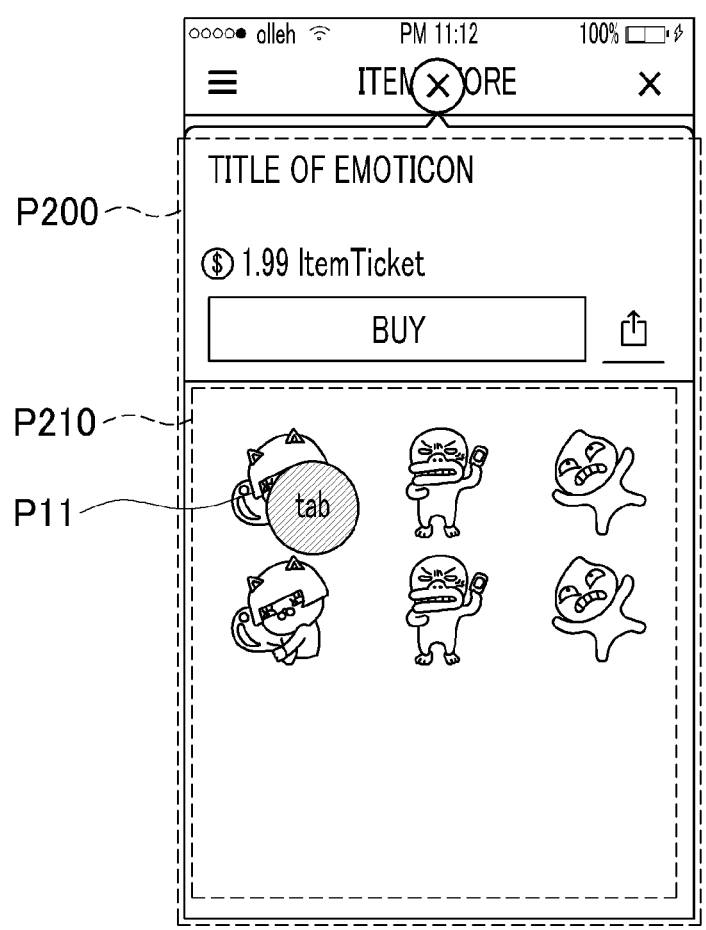
FIGS. 7A and 7B is an example diagram provided to explain a process of purchasing a scenario emoticon in accordance with various embodiments described herein.
Figure 7B:
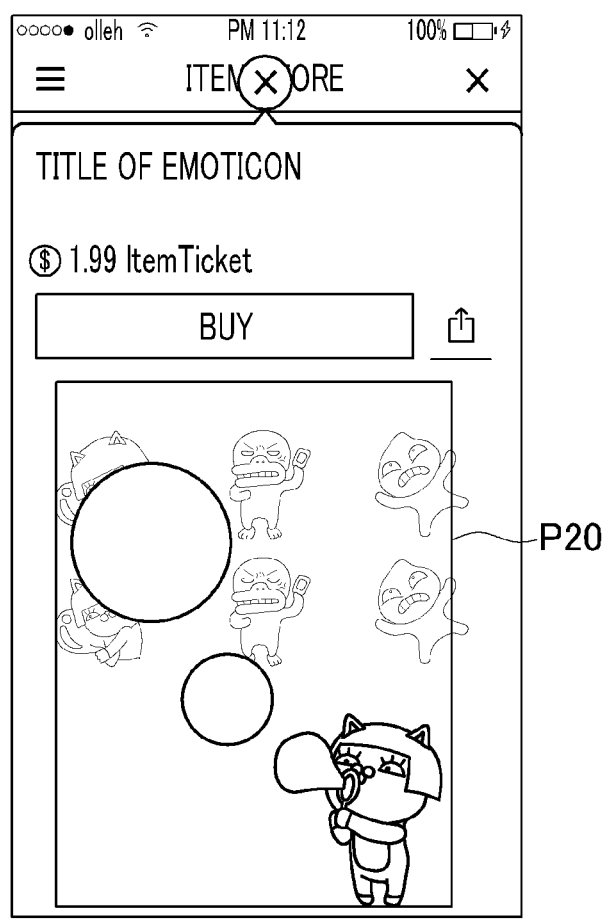

FIGS. 7A and 7B is an exemplary diagram provided to explain a process of purchasing a scenario emoticon in accordance with an exemplary embodiment of the present disclosure.

Firstly, the scenario emoticon purchasing unit (not illustrated) outputs an item purchase window P200 where thumbnail images of multiple scenario emoticons are displayed as illustrated in FIG. 7A. An emoticon selection window P210 where multiple scenario emoticon thumbnail images are displayed is included in a partial region of the item purchase window P200. The scenario emoticon purchasing unit (not illustrated) receives a user-selected input with respect to any one thumbnail image P11 of the multiple scenario emoticon thumbnail images displayed on the emoticon selection window P210.

Herein, if the use's selection for purchasing any one of the scenario emoticons is input, the scenario emoticon purchasing unit (not illustrated) may play a preview of a scenario emoticon corresponding to the thumbnail image on a predetermined region within the item purchase window as illustrated in FIG. 7B. By way of example, FIG. 7B illustrates that the scenario emoticon P20 is played as a preview as being overlapped with the region for the FIG. 7B.

Then, the scenario emoticon purchasing unit (not illustrated) receives an input for purchasing any one of the multiple scenario emoticons and then requests a purchase of the corresponding scenario emoticon from the scenario emoticon providing server (not illustrated). If the purchase of the corresponding scenario emoticon is completed after a payment process performed between the scenario emoticon providing server (not illustrated) and the user device 100, the scenario emoticon purchasing unit (not illustrated) includes the thumbnail of the purchased scenario emoticon in the emoticon selection window.

Hereinafter, a display method of a scenario emoticon using the user device 100 in accordance with an exemplary embodiment of the present disclosure will be described in detail with reference to FIG. 8.

Figure 8:
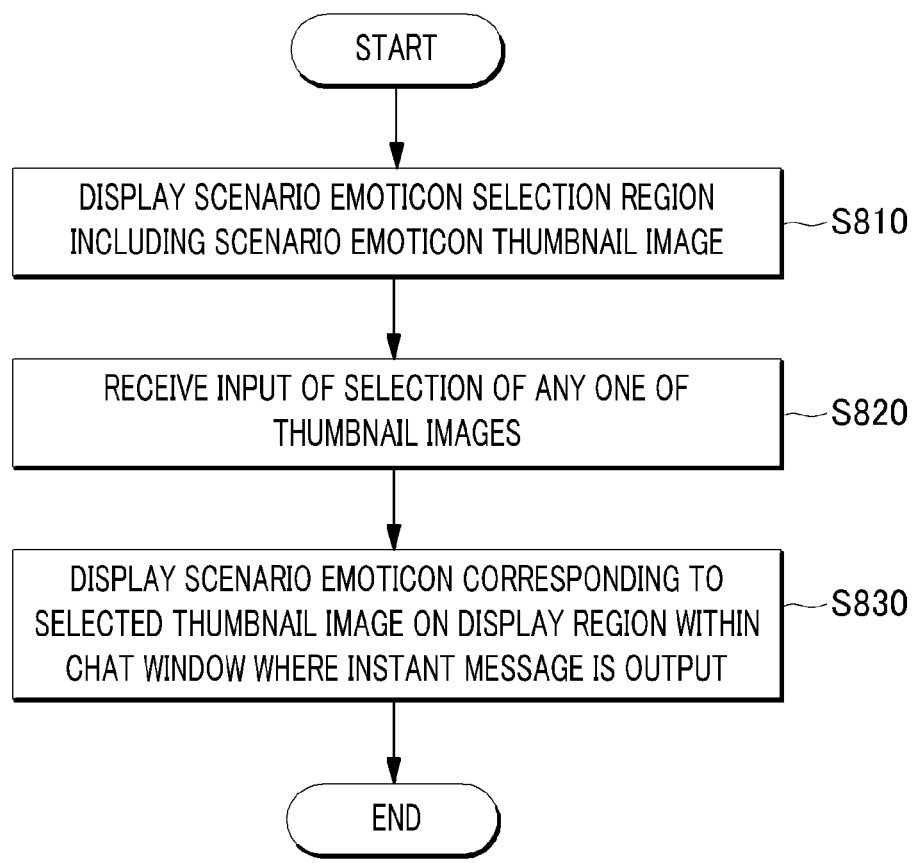
FIG. 8 is a flowchart provided to explain a display method of a scenario emoticon in accordance with various embodiments described herein.

FIG. 8 is a flowchart provided to explain a display method of a scenario emoticon in accordance with various embodiments described herein.

For reference, the following processes are implemented with the components of the user device 100 described above with reference to FIG. 1, and the user device 100 may further include components for performing a general function such as communication in addition to the above-described components.

Firstly, a scenario emoticon selection region including a thumbnail image of at least one scenario emoticon is displayed on a preset screen (S810).

The display method of a scenario emoticon in accordance with an exemplary embodiment of the present disclosure may further include: prior to S810, outputting the item purchase window where thumbnail images of multiple scenario emoticons are displayed; and playing a preview of a scenario emoticon corresponding to a thumbnail image in a predetermined region within the item purchase window when a user's selection of the thumbnail image is input.

Further, when an input for purchasing any one of the multiple scenario emoticons from the item purchase window is received, a thumbnail of the purchased scenario emoticon is included in the scenario emoticon selection window.

Then, a selection of any one of the displayed thumbnail images is input by a user (S820).

Herein, in S820, after the selection of any one of the thumbnail images is input, a preview of a scenario emoticon corresponding to the thumbnail image may be played on the display region. Then, transmission of the scenario emoticon corresponding to the thumbnail image played as a preview may be input. As such, while the user plays the preview of the scenario emoticon corresponding to the user-selected thumbnail image, an input process of a preset user interaction may be automatically skipped.

Then, the scenario emoticon according to the selection is displayed on the display region within the chat window where instant messages are output (S830).

In S830, at least one object included in the scenario emoticon plays a play file to be overlapped with a previously output speech bubble region within the display region of the chat window. Herein, while the play file of the scenario emoticon is played, at least one object is displayed according to a preset scenario, and if a user interaction about the object is input while the play file is played, a status of the object may be changed in response to the user interaction. To be specific, while the play file of the selected scenario emoticon is played, at least one of a location on the display region, a movement speed, a movement direction, and properties corresponding to at least one object may be changed. For reference, the properties of the object may include a size, transparency, a shape, a color, and the like.

Further, in S830, an E-mot file including a preset static or dynamic image may be displayed first on the display region and then a play file may be played at a preset playing time. For reference, if the E-mot file is displayed, while the play file is played, a status of the E-mot file may be changed from a status before the play file is played. Further, the E-mot file may also be displayed on a display region of a device of a conversation partner participating in the chat window, and on the display region of the device of the conversation partner, the play file may be played in a preset period of waiting time after the E-mot file is displayed or may be played when a user interaction about the E-mot file is input. Further, if the E-mot file is received while the display region of the device of the conversation partner is in an active state, the play file may be automatically played after the E-mot file is displayed.

Furthermore, in S830, the scenario emoticon may be displayed by adjusting a size of a playing region for the scenario emoticon to correspond to the display region depending on a display mode of the chat window and whether or not a user interface menu included in the chat window is activated. Herein, when the size of the playing region for the scenario emoticon is adjusted, a size of an object included in the scenario emoticon and coordinates of the object in the display region may be uniformly adjusted or only a partial region of the playing region for the scenario emoticon may be cropped.

Meanwhile, in the display method of a scenario emoticon in accordance with an exemplary embodiment of the present disclosure, prior to S830, whether or not to download a play file of the scenario emoticon selected by the user may be determined. Herein, as a result of determining whether or not to download a play file of the scenario emoticon, if the play file is previously stored, the play file may be instantly read, and then, S830 may be performed. On the other hand, if the play file is not stored, an image file including the play file of the scenario emoticon may be requested and downloaded from the scenario emoticon providing server (not illustrated) prior to S830.

Further, in the display method of a scenario emoticon in accordance with an exemplary embodiment of the present disclosure, after S830, if a reentrance into the same chat window occurs or a scroll event occurs in the display region, the E-mot file may be updated and the play file may be replayed. As such, while the play file is replayed, the play file may be played with a status of the at least one object changed from an initial status according to a change in at least one condition of as an elapsed time condition, a place condition, a season condition, and a time condition.

Furthermore, in the display method of a scenario emoticon in accordance with an exemplary embodiment of the present disclosure, if only an E-mot file of the scenario emoticon is downloaded prior to S830, the E-mot file of the user-selected scenario emoticon may be displayed in S830 and if a user interaction about the E-mot file is input, a play file corresponding to the scenario emoticon may be requested and downloaded from the scenario emoticon providing server (not illustrated) and then the downloaded play file may be played. Herein, in S830, a play file changed according to a condition for generating an input of a user interaction about the E-mot file may be played. For reference, in S830, a play file corresponding to a condition for generating an input of a user interaction about the displayed E-mot file may be downloaded from the server (not illustrated), or all of play files corresponding to the respective conditions for generating an input of a user interaction may be downloaded from the server (not illustrated) and then a play file according to a condition for generating an input of a current user interaction may be detected and played.

Moreover, after S830, if a user interaction is input in a region where an object is not displayed within the display region of the chat window while the play file of the user-selected scenario emoticon is played, a display of the scenario emoticon may be ended or the play file may be changed to a play file of a different scenario.

Further, after S830, if a user's selection of any one of user interface menus included in the chat window is input while the play file of the scenario emoticon is played, a display of the scenario emoticon may be ended and the user interface may be executed.

Furthermore, after S830, a chatting message input while the play file of the scenario emoticon is played may be output together with the scenario emoticon within the display region.

The exemplary embodiments of the present disclosure can be implemented in a computer program stored in a medium and executed by a computer or a storage medium including instructions codes executable by a computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A display method of a scenario emoticon using an instant message service performed by a user device, comprising:
   displaying a scenario emoticon selection region showing at least one thumbnail image of at least one scenario emoticon;
   receiving an input of a selection upon one from the at least one thumbnail image; and
   displaying, in response to the selection, a scenario emoticon on a display region within a chat window where an instant message is output,
      wherein the displaying of the scenario emoticon includes playing a play file to overlap at least one object included in the scenario emoticon with a previously output speech bubble region within the display region,
      wherein the playing of the play file includes displaying a motion of the at least one object according to a preset scenario corresponding to the at least one object,
      wherein, if a user input interacts with the displayed at least one object during the playing of the play file, the at least one object expresses a motion according to a different scenario from the preset scenario in response to the user input,
      wherein the play file includes at least one image file corresponding to the at least one object and a metafile including configuration data defining an expression according to the preset scenario of the at least one object,
      wherein a status of the at least one object is changed in different ways on the basis of at least one of different locations of the at least one object in the display region, different input time of the user input, or different display modes of the chat window,
      wherein the status of the at least one object includes a location on the display region, movement speed, movement direction, or properties of the at least one object,
      wherein, when the scenario emoticon is played according to a display mode of the chat window, at least one of the status and a motion of the at least one object displayed on the display region is changed, and
      wherein, when displaying of the scenario emoticon, a size of the at least one object included in the scenario emoticon is adjusted depending on a display mode of the chat window and whether or not a user interface menu included in the chat window is activated.

2. The display method of a scenario emoticon of claim 1, wherein, while the play file is played, at least one of the location on the display region, the movement speed, the movement direction, and the properties of the at least one object is changed, and wherein the properties of the at least one object includes size, transparency, shape, or color of the at least one object.

3. The display method of a scenario emoticon of claim 1, wherein the scenario emoticon includes one or more play files, of which multiple play files respectively include different objects.

4. The display method of a scenario emoticon of claim 1, wherein the displaying of the scenario emoticon includes:
displaying an e-mot file including a preset static or dynamic image on the display region; and
playing the play file at a preset playing time.

5. The display method of a scenario emoticon of claim 4, wherein, while the play file is played, a status of an image of the e-mot file is changed.

6. The display method of a scenario emoticon of claim 4, wherein:
the e-mot file is also displayed on a display region of a device of a conversation partner participating in the chat window, and
on the display region of the device of the conversation partner, the play file is played when a preset period of waiting time passes after the e-mot file is displayed or a user interaction about the e-mot file is input.

7. The display method of a scenario emoticon of claim 6, wherein, if the e-mot file is received while the display region of the device of the conversation partner is in an active state, the play file is automatically played after the e-mot file is displayed.

8. The display method of a scenario emoticon of claim 4, wherein, if a reentrance into the chat window occurs or a scroll event occurs in the display region, the e-mot file is updated and the play file is replayed.

9. The display method of a scenario emoticon of claim 8, wherein, when the play file is replayed, the play file is replayed with a status of the at least one object changed from an initial status according to a change in at least one condition of a place condition, a season condition.

10. The display method of a scenario emoticon of claim 1, further comprising:
prior to the displaying of the scenario emoticon, determining whether the play file of the scenario emoticon and the e-mot file are stored, wherein the e-mot file is to be displayed before the play file is played,
if the play file is stored, the stored play file is read and then the scenario emoticon is displayed, and
if the play file is not stored, the play file is downloaded from a scenario emoticon providing server prior to the displaying of the scenario emoticon.

11. The display method of a scenario emoticon of claim 10, further comprising, if the play file is not stored but the e-mot file is stored:
displaying the e-mot file on the display region;
requesting and downloading the play file from the scenario emoticon providing server if a user interaction about the e-mot file is input; and
displaying the scenario emoticon.

12. The display method of a scenario emoticon of claim 11, wherein, when displaying the scenario emoticon, a play file is changed dependent on a condition for generating a user interaction.

13. The display method of a scenario emoticon of claim 12, wherein in the displaying of the scenario emoticon includes:
downloading play files corresponding to preset conditions for generating a user interaction from the scenario emoticon providing server; and
detecting and playing a play file according to the condition for generating a user interaction from among the downloaded play files.

14. The display method of a scenario emoticon of claim 12, wherein, during the requesting and downloading of the play file from the scenario emoticon providing server, the play file dependent on the condition for generating a user interaction is downloaded from the scenario emoticon providing server.

15. The display method of a scenario emoticon of claim 1, further comprising:
after the displaying of the scenario emoticon, and if a user input interacts with a region where the at least one object is not displayed within the display region while the play file is played, ending a display the displaying of the scenario emoticon.

16. The display method of a scenario emoticon of claim 1, further comprising:
after the displaying of the scenario emoticon and if a user input interacts with a region where the at least one object is not displayed within the display region while the play file is played, changing the play file to a next play file that expresses a next scenario different from a scenario of the play file.

17. The display method of a scenario emoticon of claim 1, further comprising, after the displaying of the scenario emoticon:
ending a display of the scenario emoticon if a user's selection upon one of user interface menus included in the chat window is input while the play file is played, and
performing the user interface corresponding to the user's selection.

18. The display method of a scenario emoticon of claim 1, wherein:
when displaying the scenario emoticon, a size of a playing region for the scenario emoticon is adjusted to correspond to the display region depending on a display mode of the chat window and whether or not the user interface menu included in the chat window is activated, and
when the size of the playing region for the scenario emoticon is adjusted, a size of the at least one object included in the scenario emoticon and coordinates of the at least one object in the display region are uniformly adjusted or only a partial region of the playing region for the scenario emoticon is cropped.

19. A user device that displays a scenario emoticon using an instant message service, comprising:
a memory configured to store a program for performing a display method of an emoticon using an instant message service, thumbnail images of multiple scenario emoticons, and a scenario emoticon file; and
a processor configured to execute the program, wherein when the program is executed, the processor:
generates a chat window in which two or more users participate, displays an instant message input by the users on a display region,
displays an emoticon selection region showing the thumbnail images stored in the memory, and receives an input of the user's selection upon one of the thumbnail images,
reads a scenario emoticon file corresponding to the selected thumbnail image from the memory and plays a play file included in the scenario emoticon file on the display region,
　　wherein the playing of the play file includes playing the play file to overlap at least one object included in the scenario emoticon with a speech bubble region shown within the display region,
　　wherein a motion of the at least one object is displayed according to a preset scenario corresponding to the at least one object,
　　wherein, if a user input interacts with the displayed at least one object during the playing of the play file, the at least one object expresses a motion according to a different scenario from the preset scenario in response to the user input,
　　wherein the play file includes at least one image file corresponding to the at least one object and a metafile including configuration data defining an expression according to the preset scenario of the at least one object,
　　wherein a status of the at least one object is changed in different ways on the basis of at least one of different locations of the at least one object in the display region, different input time of the user input, or different display modes of the chat window,
　　wherein the status of the at least one object includes a location on the display region, movement speed, movement direction, or properties of the at least one object,
　　wherein, when the scenario emoticon is played according to a display mode of the chat window, at least one of the status and a motion of the at least one object displayed on the display region is changed, and
　　wherein, when displaying of the scenario emoticon, a size of the at least one object included in the scenario emoticon is adjusted depending on a display mode of the chat window and whether or not a user interface menu included in the chat window is activated.

* * * * *